US011769464B2

(12) United States Patent
Novikov et al.

(10) Patent No.: US 11,769,464 B2
(45) Date of Patent: Sep. 26, 2023

(54) IMAGE PROCESSING

(71) Applicants: Apical Limited, Cambridge (GB); Arm Limited, Cambridge (GB)

(72) Inventors: Maxim Novikov, Manchester (GB); Yanxiang Wang, Manchester (GB); Damian Piotr Modrzyk, Katowice (PL)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 17/465,378

(22) Filed: Sep. 2, 2021

(65) Prior Publication Data

US 2023/0061966 A1 Mar. 2, 2023

(51) Int. Cl.

| | |
|---|---|
| ***G09G 5/02*** | (2006.01) |
| ***G09G 5/06*** | (2006.01) |
| ***G09G 3/20*** | (2006.01) |
| ***H04N 1/60*** | (2006.01) |
| ***H04N 9/64*** | (2023.01) |
| ***H04N 9/69*** | (2023.01) |
| ***H04N 9/76*** | (2006.01) |

(52) U.S. Cl.

CPC ............. *G09G 5/06* (2013.01); *G09G 3/2003* (2013.01); *G09G 2340/06* (2013.01)

(58) Field of Classification Search

CPC .......... G09G 5/02; G09G 5/06; G09G 3/2003; G09G 2340/06; G09G 2340/10; G09G 2340/12; G09G 2340/125; G09G 2340/16; H04N 1/60; H04N 1/6002; H04N 1/6008; H04N 1/6019; H04N 1/6027; H04N 1/6058; H04N 9/64; H04N 9/69; H04N 9/76; H04N 11/20

See application file for complete search history.

(56) References Cited

U.S. PATENT DOCUMENTS

| | | | | |
|---|---|---|---|---|
| 5,870,097 | A * | 2/1999 | Snyder | G06T 13/80 345/422 |
| 7,554,562 | B2 * | 6/2009 | MacInnis | G06T 1/60 345/592 |
| 11,252,299 | B1 * | 2/2022 | Wu | H04N 1/6058 |
| 2010/0245928 | A1 * | 9/2010 | Zhao | B42D 25/333 358/3.28 |
| 2014/0133749 | A1 * | 5/2014 | Kuo | H04N 5/213 382/167 |
| 2020/0314289 | A1 * | 10/2020 | Wu | G06T 3/4015 |
| 2021/0152801 | A1 * | 5/2021 | Wang | H04N 9/64 |
| 2022/0189029 | A1 * | 6/2022 | Mequanint | G06V 10/764 |

* cited by examiner

*Primary Examiner* — Wesner Sajous
(74) *Attorney, Agent, or Firm* — EIP US LLP

(57) ABSTRACT

A computer-implemented method, a computer system configured to perform the method, and a non-transitory computer-readable storage medium are provided comprising instructions for executing the method are provided. The computer-implemented method comprises obtaining input video data including frames of input image data comprising first image data values expressed in an input color space. The first image data values are processed with a first and second color space conversion process to generate first processed image data and second processed image data respectively. The first processed image data and the second processed image data include image data values expressed in an output color space. Output image data is derived from both the first processed image data and the second processed image data.

18 Claims, 13 Drawing Sheets

100

IMAGE PROCESSING

BACKGROUND

Field of the Invention

The present disclosure relates to method and systems for image processing. In particular, but not exclusively, the present disclosure relates to processing image data to convert from one color space to another.

Description of the Related Technology

Electronic color displays are able to show images using arrays of pixels. In the case of LED and OLED displays, each pixel location is implemented using a red, a green, and a blue LED. The size of the LEDs used at each pixel location means that, to a viewer, the light being emitted from the red, green, and blue LEDs appear to emanate from the same point. Different colors can be produced by modifying the relative intensity of each of the red, green, and blue lights at a pixel location. In some cases, each of the red, green, and blue LED are of equal size, while in other cases, the size and/or shape of each of the LEDs for a given pixel location may differ.

A number of different standards for displaying color images using digital displays exist including, for example, ITU-R Recommendation BT.2020, more commonly known as Rec. 2020, or ITU-R Recommendation BT.709, more commonly known as Rec. 709. Each of these standards generally specify how certain colors are represented in image data. The image data may be used by a digital display to reproduce a color image. Different standards are also generally associated with different characteristics, for example, some standards are capable of representing colors which other standards are not. In particular, Rec. 2020 is capable of representing colors that cannot be shown using Rec. 709. That is to say that the Rec. 2020 color space has a wider color gamut than the Rec. 709 color space.

Image data, representing photos or videos may be used to reproduce an image on a plurality of device types which implement a variety of different standards and/or color spaces. For example, a video streaming service, implemented on the web or using an application, may be capable of streaming video on both a mobile device and laptop computer. The display included in the mobile device may be a different type of display to the display included in the laptop computer, and hence may operate using a different standard for representing color in image data. In some cases, a color space which is representable using a particular display may not correspond directly to a color space defined by a standard such as Rec. 2020. A color space which is reproduceable by a display may be similar to one or more such standards, for example, a digital display may be capable to reproducing a color gamut which is between the color gamut of two different standards.

SUMMARY

According to a first aspect of the present disclosure there is provided a computer implemented method for processing image data, the computer implemented method comprising: obtaining input video data including a sequence of frames of input image data, the input image data comprising first image data values expressed according to an input color space; generating first processed image data comprising second image data values expressed according to an output color space, different to the input color space, by processing the input image data using a first color space conversion process; generating second processed image data comprising third image data values expressed according to the output color space by processing the input image data using a second color space conversion process, wherein the second color space conversion process uses a different color space conversion function to the first color space conversion process; and generating output image data derived from both the first processed image data and the second processed image data.

According to a second aspect of the present disclosure there is a provided a computer system comprising processing circuitry, the processing circuitry being configured to: obtain input video data including a sequence of frames of input image data, the input image data comprising first image data values expressed according to an input color space; generate first processed image data comprising second image data values expressed according to an output color space, different to the input color space, by processing the input image data using a first color space conversion process; generate second processed image data comprising third image data values expressed according to the output color space by processing the input image data using a second color space conversion process, wherein the second color space conversion process uses a different color space conversion function to the first color space conversion process; and generating output image data derived from both the first processed image data and the second processed image data.

According to a third aspect of the present disclosure there is provided a non-transitory computer-readable storage medium comprising computer-executable instructions which, when executed by one or more processors, cause the one or more processors to perform a process including: obtaining input video data including a sequence of frames of input image data, the input image data comprising first image data values expressed according to an input color space; generating first processed image data comprising second image data values expressed according to an output color space, different to the input color space, by processing the input image data using a first color space conversion process; generating second processed image data comprising third image data values expressed according to the output color space by processing the input image data using a second color space conversion process, wherein the second color space conversion process uses a different color space conversion function to the first color space conversion process; and generating output image data derived from both the first processed image data and the second processed image data.

DETAILED DESCRIPTION

Figure 1:
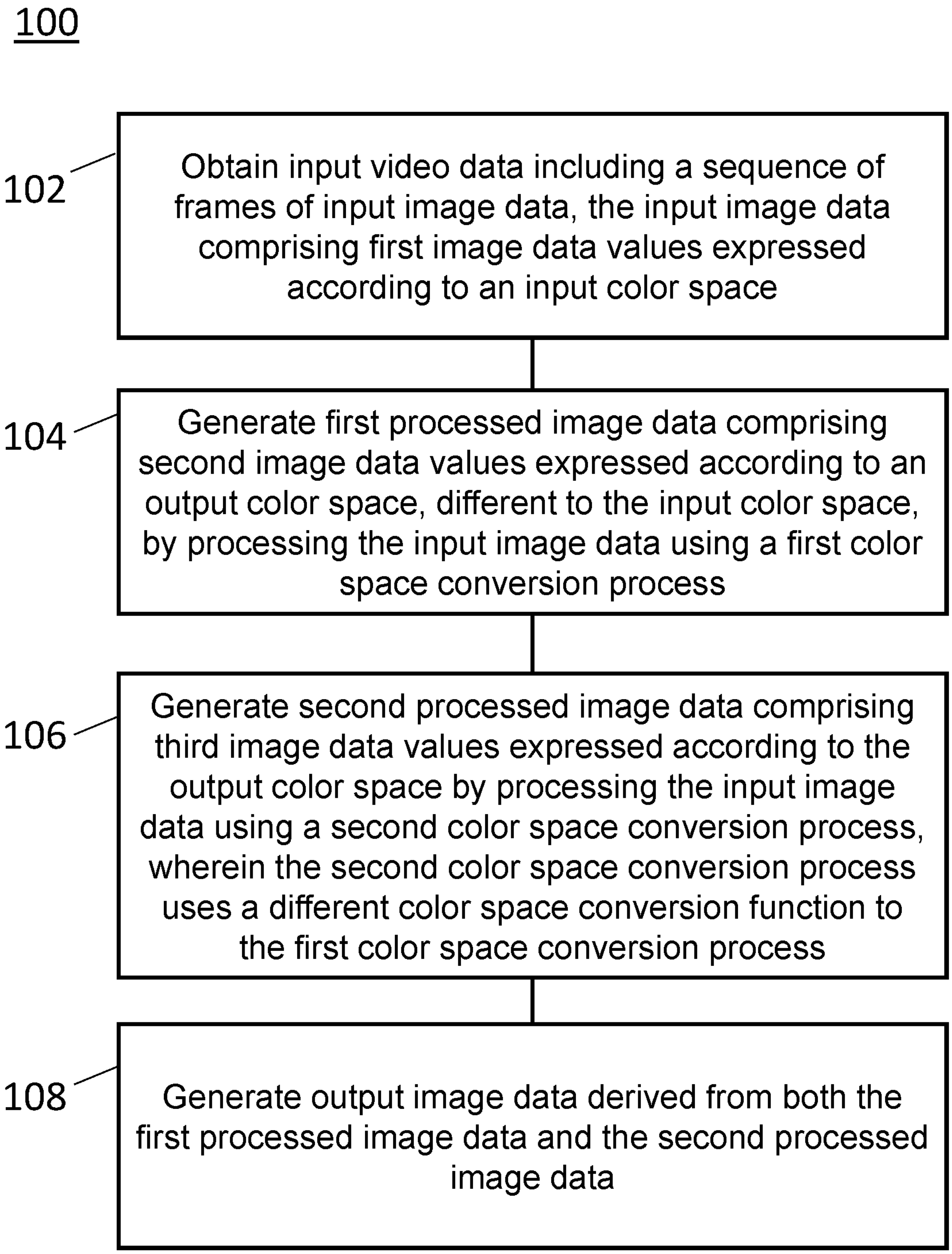
FIG. 1 is flow chart showing a computer-implemented method according to examples.

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily other examples. It should be further noted that certain examples are described schematically with certain features omitted and/or necessarily simplified for ease of explanation and understanding of the concepts underlying the examples.

Computer systems and computer-implemented methods for processing input image data to generate output image data are described herein. In particular, the input image data may include a representation of an image according to an input color space and the output image data may include a representation of the image according to an output color space. The image data may comprise image data values, also referred to as pixel data values, which are expressed according to a particular color space. The image data may be provided in video data comprising a sequence of frames of image data, such as in a video stream. In some cases, the input color space may relate to a color space used when the input image data is generated while the output color space may relate to a color space which is used by a digital display to display the image using the output image data.

The input color space, according to which the image is represented in the input image data, may be a Red, Green, Blue (RGB) color space. RGB color spaces are generally additive color spaces based on the RGB color model. The RGB color model is an additive color model in which red, green, and blue light are added together in various combinations to reproduce a broad array of colors. The RGB color model is generally used for the display of images in electronic systems such as televisions, computers, and mobile devices, such as a phones and tablets. Digital displays generally comprise a red, green, and blue light for each pixel location in the display. In electronic systems, an RGB color value may be represented using a value for each of the red, green and blue components, the values specifying the intensity of the respective color light. The values may be represented using bits, for example each of the red, green, and blue may be represented using, for example, an 8-bit, 16-bit, or 32-bit value.

The RGB color model is not a universal model but is instead device dependent, Different devices may reproduce a given RBG value differently depending on the color elements, such as phosphors, dyes, or LEDs, used. This is because the different color elements used in different displays may respond to individual red, green, and blue values differently. In order to display the same color across a plurality of displays or display types color management is used to modify RGB color values so that the same colors can be accurately reproduced across multiple devices.

The gamut, or color gamut, of a specific color space refers to the complete subset of colors which can be displayed in that specific color space. The color gamut which can be displayed using a given digital display may be dependent on the arrangement and luminance of the color elements used to produce the RGB light for each pixel location. There is a plurality of different color spaces which may be commonly used for digital displays including, for example, sRGB, Adobe RGB, HDTV (Rec. 709), UHDTV (Rec. 2020), and so forth. Although in some examples, a color space directly associated with a given digital display may not directly correspond to a standardized color space but rather may be specific to the display. Where image data has been generated in one color space, such as sRGB, to display the image accurately, that is to say to reproduce the same appearance of colors, on a display which implements the UHDTV color space, color management is required. The digital representations used to display different color spaces are standardized. For example, the UHDTV color space is standardized in the ITU-R Recommendation BT.2020, more commonly known as Rec.2020 and in the ITU-R Recommendation BT.2100 standards.

Color management may be implemented using three-dimensional Lookup-Tables (3D LUTs) which are used to map one color space to another. A 3D LUT can be represented as a 3D lattice of output RGB values which are indexed by sets of input RGB values. When converting from a first color space, say sRGB, to a second color space, say UHDTV, a 3D LUT representing a mapping from the sRGB to UHDTV may be used. 3D LUTs may be generated by computing entries for the 3D LUT using a conversion operation, or a transformation function, from one color space to another color space for a set of primary colors. Where a color in an input color space does not directly relate to a specific entry in the 3D LUT, an interpolation from nearby entries in the 3D LUT may be used to convert the color in the input color space to a color in the output color space.

Throughout the present disclosure, specific examples will be described with respect to RGB color spaces as outlined above. However, it will be appreciated by one skilled in the art that the examples described herein are also applicable to alternative color spaces. For example, Y'UV color spaces may be used in which "Y'" defines a Luma component, and "U" and "V" define two chrominance components, where "U" is blue projection and "V" is red projection. Y'UV is also be used to describe file formats that are encoded using YCbCr which similarly defines color in terms of a Luma component, Y', and blue, Cb, and red Cr, chroma components. Other examples include Hue, Saturation, Lightness (HSL) and Hue, Saturation, Value (HSV) representations of color. It will be appreciated by one skilled in the art that the present methods may be applied to any color space exhibiting suitably similar logic to the examples described herein.

Other approaches to color management also include using color conversion matrices (CCM) to map colors from one color space to another. Different systems for color management may vary in performance depending on the image data to which they are being applied. In particular, where the gamut of an input color space and an output color space differ there can be difficulties when attempting to make full use of the gamut available in the output color space. Certain methods of color management may perform better when converting colors which are outside of the gamut of the output color space than other methods. On the other hand, some other methods of color management may be more adept at converting colors which are inside the gamut of the output color space. The present disclosure provides methods and systems which make use of multiple color management processes when converting image data from an input color space to an output color space. In this way, it is possible to make use of the strengths of multiple different color management processes to generate output image data representing the image. This also allows the conversion of colors in an input color space to an output color space to be tuned according to content gamut, which represents the full subset of colors which are used in the input image data, rather than the gamut of the input color space.

Figure 2:
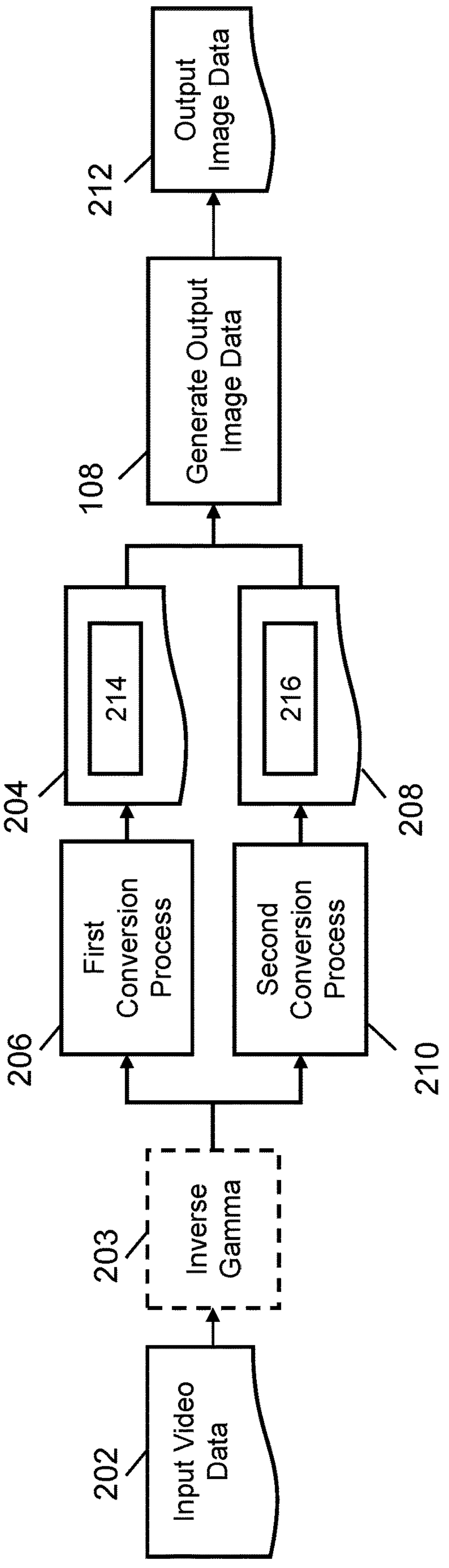
FIG. 2 is a schematic diagram showing the computer-implemented according to examples.

FIGS. 1 and 2 show a computer-implemented method 100 for processing image data, in particular to convert input image data which represents an image according to a first color space, to output image data, representing the image according to a second, different, color space. The method 100 includes obtaining 102 input video data 202 including a sequence of frames of input image data comprising image data values, also referred to as image data values, which are expressed according to an input color space. In some examples, the sequence of frames of image data includes a sequence of images captured in the same scene such that the colors represented in adjacent frames of the video data 202 are generally similar. The video data may also include frames of image data captured in a different scene and in this case, there may be a disjoint in the similarity of colors between adjacent frames of image data representing different scenes. The video data 202 may comprise other types of data including for example, audio data, metadata, and so forth.

The input color space may be any suitable input color space which can be used to represent an image in the video data 202. For example, the input color space may be any of, sRGB, Adobe RGB, Rec. 709, Apple RGB, Adobe Wide Gamut RGB, Rec. 2020, and so forth. Frames of image data in the input video data 202 may be gamma corrected, which includes applying a non-linear operation to encode luminance and color. Where the input video data 202 is gamma corrected, an inverse gamma function 203 may be applied to the input video data 202.

Figure 3:
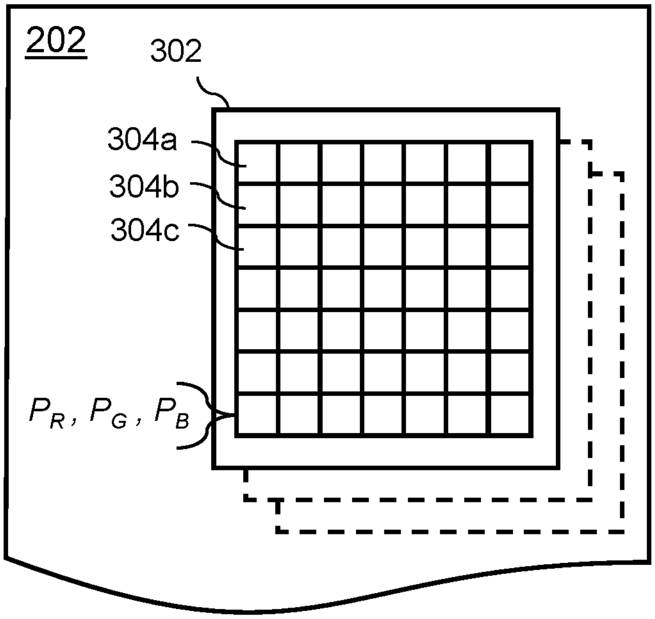
FIG. 3 is a schematic diagram showing input image data according to examples.

FIG. 3 shows an example of the input video data 202 including a sequence of frames of input image data. A first frame of input image data 302 is shown. Each frame of input image data 302 represents a plurality of pixel location 304*a*, 304*b*, and 304*c*. Only a subset of the pixel locations 304*a*, 304*b*, and 304*c* have been labelled in the example shown in FIG. 3. The input image data 302 comprises first image data values $P_R$, $P_G$, $P_B$. In the example shown, there are a plurality of image data values $P_R$, $P_G$, $P_B$ representing each pixel location 304*a*, 304*b*, and 304*c*. Each image data value $P_R$, $P_G$, $P_B$ associated with a given pixel location represents an intensity of a respective color of red, green, or blue. These image data values $P_R$, $P_G$, $P_B$ may be represented in the input image data 302 using bit representations, such as 8-bit, 10-bit, 12-bit, 16-bit, or 32-bit representations, and so forth. The bit representations of image data values in the input image data 302 may include bit values having a length defined in powers of two, i.e. 2, 4, 8, 16, and also may include bit values having other lengths e.g. 10-bit, 12-bit, 18-bit, 20-bit, and so forth.

Returning to FIGS. 1 and 2, first processed image data 204 comprising second image data values 214 expressed according to an output color space, which is different to the input color space, is generated 104 by processing the input image data 302 using a first color space conversion process 206. The output color space may be any suitable color space, such as those listed above with respect to the input color space. The output color space may, in some instances, relate to a color space in which the image is to be displayed, such as the color space of a target digital display.

In one example, the first color space conversion process 206 includes applying a color conversion matrix (CCM) to the input image data 302. The application of a CCM to image data values representing a given pixel location is illustrated in equation 1 below:

$$\begin{bmatrix} Q_R \\ Q_G \\ Q_B \end{bmatrix} = C \begin{bmatrix} P_R \\ P_G \\ P_B \end{bmatrix} \tag{1}$$

wherein the image data values representing a pixel location in the input color space are represented by $P_R$, $P_G$, $P_B$, the image data values representing the pixel location in the output color space are represented by $Q_R$, $Q_G$, $Q_B$, and the color conversion matrix is represented as C.

Using a CCM to perform color space conversion provides accurate transformation of colors which are within the color gamut of the output color space, and in some cases outperforms the use of 3D LUTs for converting colors which are within the gamut of the output color space. In particular, using CCMs may allow highly saturated colors to be accurately displayed in the output color space. However, colors which are outside of the color gamut of the output color space may be clipped when transforming to the output color space, resulting in detail loss and potential hue changes in the image when displayed in the output color space.

Second processed image data 208 comprising third image data values 216 expressed according to the output color space is generated 106 using a second color space conversion process 210. The second color space conversion process 210 is different to the first color space conversion process 206. In particular, the first color space conversion process 206 uses a different color space conversion function to the second color space conversion process 210. For example, the second color space conversion process 210 may be a different type of process to the first color space conversion process 206. Where the first color space conversion process 206 includes using a CCM the second color space conversion process 210 may include using an LUT, and in particular a 3D LUT to convert image data values representing colors in the input color space to image data values 216 representing colors in the output color space. Using 3D LUTs generally provides accurate color conversion, however, where the content gamut expressed in the frame of input image data 302 is smaller than the full gamut of the input color space, there can be losses in saturation. The losses in saturation occur in these situations because the transformation, represented by the 3D LUT, acts to compress a larger gamut into a smaller gamut. When doing so, some parts of the input gamut may be over-compressed, that is to say, compressed to a greater extent than other parts of the input gamut, in order to allow more space in the output space for colors which are more saturated.

The losses in saturation described above are exhibited as certain colors appearing washed out when displayed in the output color space. This is because the entries in 3D LUTs are generally not equidistantly distributed, instead the 3D LUT represents a perceptually uniform conversion. The perception of color by the human eye is not uniform across a whole gamut, and so the 3D LUT may be configured such that differences in colors represented by image data values in the input color space are perceptually, rather than computationally, reproduced in the image data values in the output color space. Generally, the conversion from one color space to another represented by the 3D LUTs may be non-linear near the limits of the gamut, or gamut boundary, the limits of the gamut being the colors which are brightest and most saturated.

Figure 4:
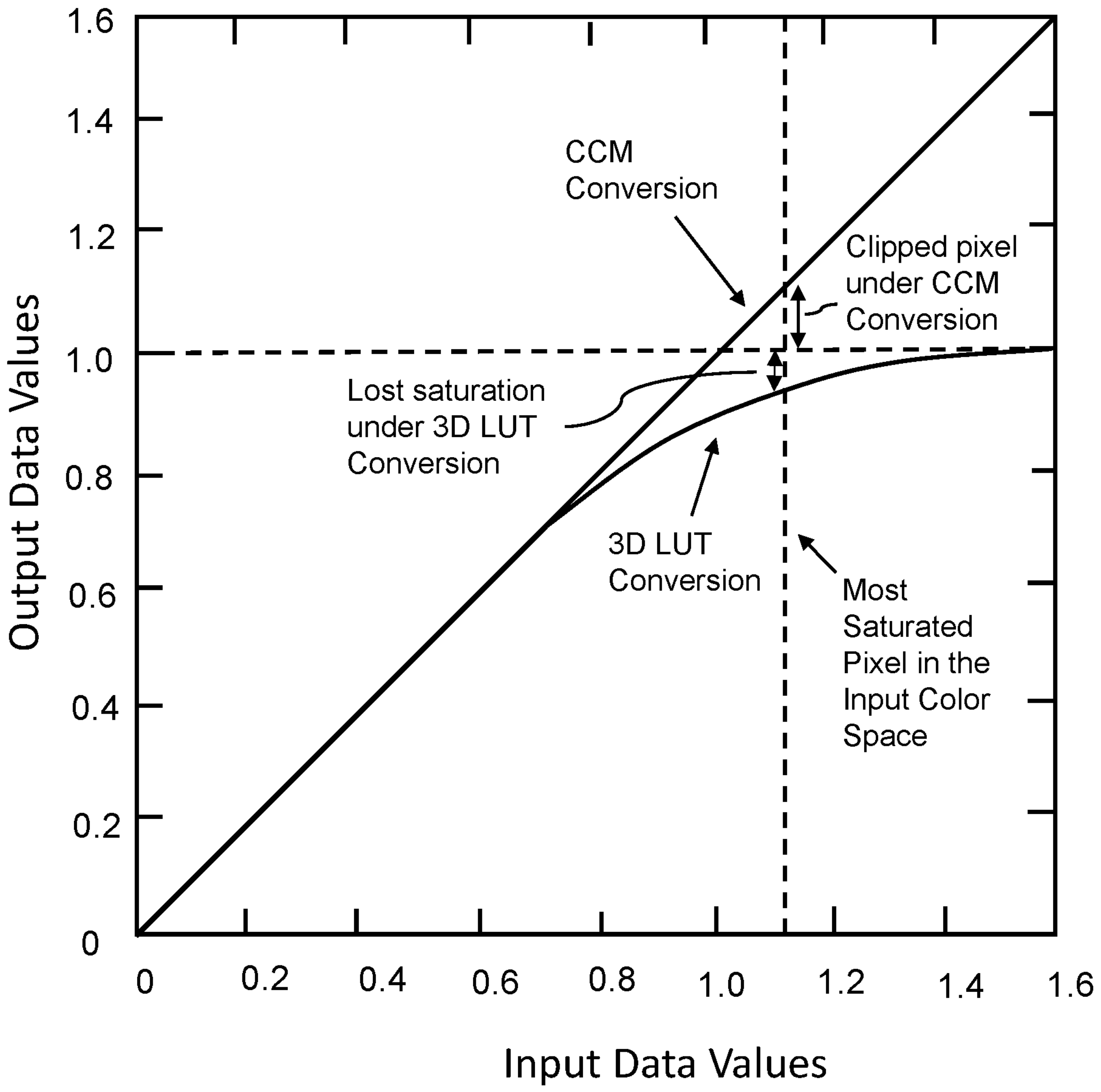
FIG. 4 is a graph illustrating a simplified mapping for a one-dimensional data set using two different mapping techniques.

FIG. 4 shows a simplified comparison of the mappings implemented by CCM processing and 3D LUT processing when applied to a one-dimensional input data set. In the example shown here, the mappings using a CCM and a 3D LUT are computed to map from an input range, between 0 to 1.6, to an output range of the output data 0 to 1.0. For example, the input range may relate to the input color space, while the output range may relate to the output color space. For a given input data set, for example an image represented by a set of image data values, having a maximum input value of 1.1, the performance of the CCM and 3D LUT differs when converting to the output data range, or output color space. Where the maximum input value is within the input range, transforming the input values using the 3D LUT can result in an unused portion of the output data range. If we relate this example to an output color space, this may be realized as a loss in saturation in the image when displayed in the output color space. Where the maximum input value is within the input range, but outside of the output range, then converting using a CCM can result in the largest values in the input data being clipped, leading to a loss of granularity in the larger data values when converted to output data. If we relate this to the example of color space conversion, then the clipping may result in a loss of detail at the most saturated colors.

One approach to improve the conversion performed using 3D LUTs is to recompute the coefficients in the 3D LUT for each frame of image data that is processed. This would be done by determining the content gamut of the frame of image data and generating a 3D LUT which maps from the content gamut to the gamut of the output color space. However, recomputing the 3D LUT based on the gamut expressed in a given frame of image data is a costly operation in terms of processing resources. Recomputing the coefficients may also take considerable time meaning that where a large number of frames are to be processed sequentially, for example when processing video data, there is a lag in the production of output image data to be displayed. Hence, it is preferred, where possible, to use a static 3D LUT, or to use the same 3D LUT for a large number of frames, rather than recomputing a new 3D LUT for each frame of image data.

The method 100 includes generating 108 output image data 212 which is derived from both the first processed image data 204 and the second processed image data 208. Specific examples of generating the output image data 212 will be described below with respect to FIGS. 5 to 8. Generating 108 the output image data 212 using the first processed image data 204 and the second processed image data 208 allows the output image data 212 to be generated in a manner which mitigates any shortcomings which are present when using just one of either of the first 206 or second color space conversion process 210 and can allow the generation of the output image data 212 to be content specific, that is to say responsive to the content gamut of the image represented by the image data 302.

In one example, generating 108 the output image data 212 comprises selecting between second image data values 214 of the first processed image data 204 and third image data values 216 the second processed image data 208. As discussed above, while the first processed image data 204 and the second processed image data 208 both represent the image according to the output color space, the representation of a given color in the image may differ between first 204 and second 208 processed image data due to the difference in the first color space conversion process 206 and the second color space conversion process 210. In this example, generating 108 the output image data 212 may include determining which of the first processed image data 204 and second processed image data 208 is able to represent colors of the input image data 302 more accurately in the output color space, and selecting the processed image data 204 or 208 based on that determination. In this way it is possible to select between a first color conversion technique and a second color conversion technique for the image based on the content of the image, and in particular the content gamut. The content gamut of the image may be same as the gamut of the input color space or may be narrower than the gamut of the input color space. Not all images represented in a given color space may make use of all colors available in the gamut of that color space. For example, where the content gamut is smaller than the gamut of the input color space, CCM may be used to generate the output image data 212, alternatively, where the content gamut makes use of the full gamut of the input color space a 3D LUT may be used to generate the output image data 212.

Figure 5:
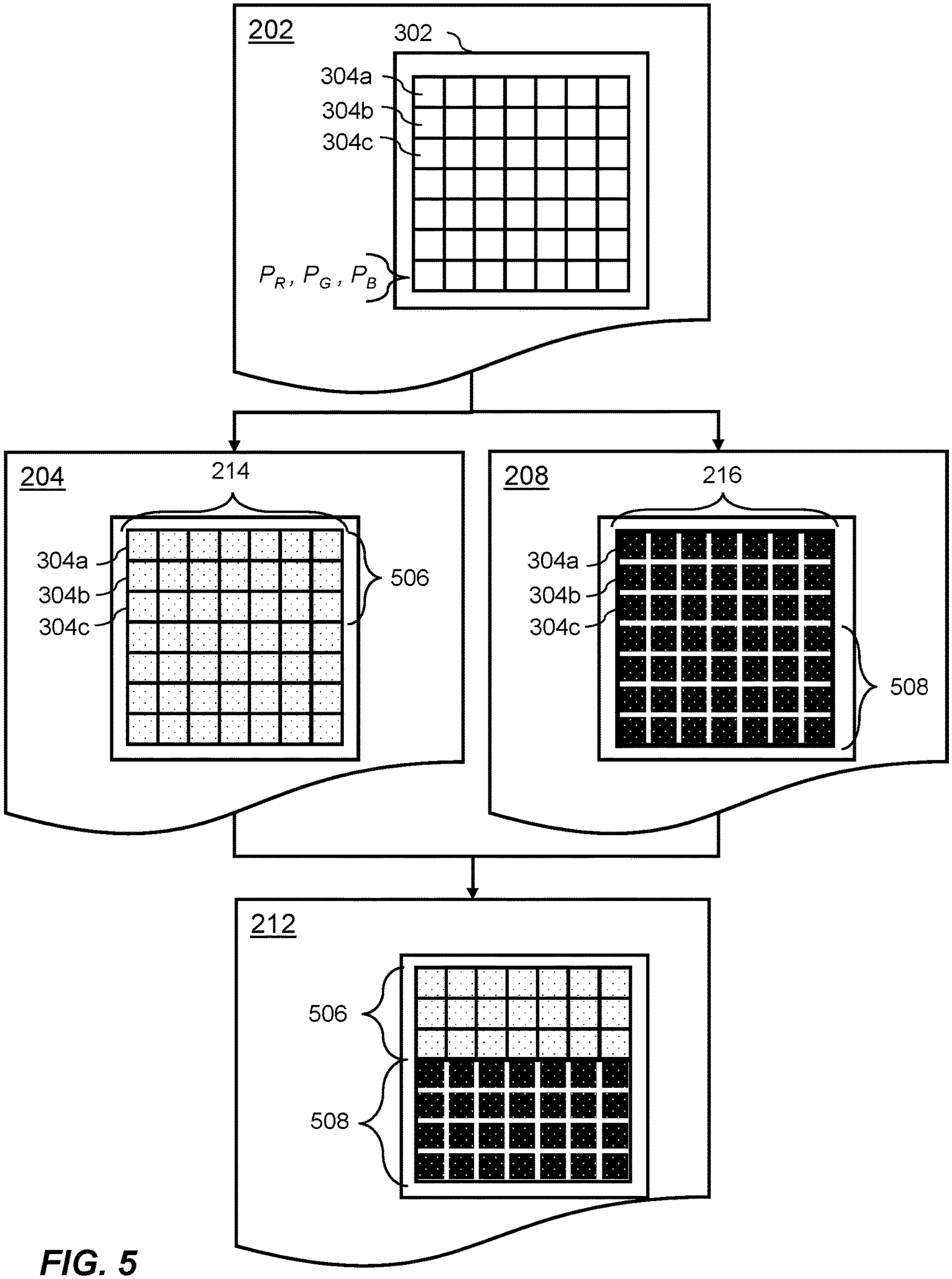
FIG. 5 is a schematic diagram showing the generation of output image data according to examples.

In another example, generating the output image data 212 comprises combining second image data values 214 of the first processed image data 206 and third image data values 216 of the second processed image data 208. As described above in relation to FIG. 3, the input image data 302 includes first image data values $P_R$, $P_G$, $P_B$ representing a plurality of pixel locations 304*a*, 304*b*, 304*c* in the image. FIG. 5 shows an example in which the first processed image data 204 comprises second image data values 214 representing the plurality of pixel locations 304*a*, 304*b*, 304*c* and the second processed image data 208 comprises third image data values 216 representing the plurality of pixel locations 304*a*, 304*b*, 304*c*. In this case, combining the first processed image data 204 and the second processed image data 208 includes selecting a subset 506 of the second image data values 214 and selecting a subset 508 of the third image data values 216. The subset 506 of the second image data values 214 which are selected represent a first subset of pixel locations, and the subset 508 of the third image data values 216 which are selected represents a second subset of pixel locations, wherein the first subset of pixel locations is different to the second subset of pixel locations. By selecting subsets 506 and 508 of the second 214 and third 216 image data values representing different pixel locations, it is possible to use the processed image data which is most suitable for each of the pixel locations. For example, where certain pixel locations are clipped in the first processed pixel data 502, portions of the second processed pixel data 506 representing these pixel locations may be selected instead. Where the color of certain pixel locations in the input pixel data 304 are within the gamut of the input color space, a portion of the first processed pixel data 504 which represents these pixels location may be used instead.

Figure 6:
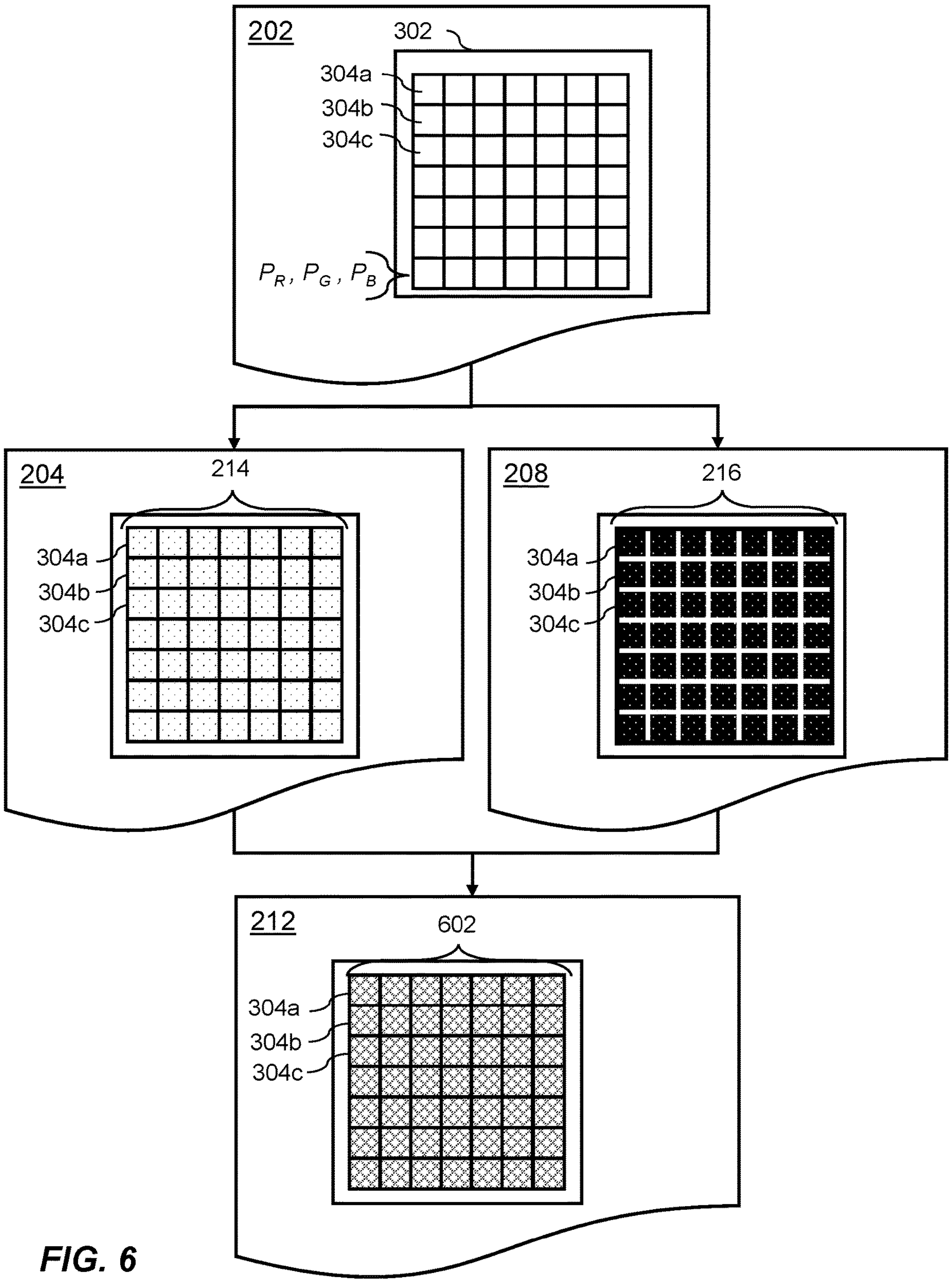
FIG. 6 is a schematic diagram showing the generation of output image data according to examples which are different to the examples of FIG. 5.

In another example, shown in FIG. 6, combining the first processed image data 204 and the second processed image data 208 comprises, for at least one pixel location 304*a*, blending second image data values 214 representing the pixel location with third image data values 216 representing the pixel location 304*a*, to generate fourth image data values 602 representing the location 304*a*. As described above, the image data values 214 and 216 may include a plurality of values for each of the pixel locations 304*a*, 304*b*, and 304*c*, for example, each pixel location 304*a* may be represented by at least three image data values representing each of the colors red, green, and blue. Where the second and third image data values 214 and 216 include a plurality of image data values for each pixel location, blending the second image data values 214 representing the pixel location 304*a* with the third image data values 216 representing the pixel location 304*a* may include blending second image data values 214 representing the pixel location with corresponding third image data values 216 representing the pixel location. A second image data value 214 and a third image data value 216 may be said to correspond if they represent the same pixel location 304*a* and are associated with the same color.

In some instances, combining the first processed image data 204 and the second processed image data 208 may include blending second image data values 214 in the first processed pixel data 502 with third image data values 216 in the second processed pixel data 504 for each pixel location 304*a*, 304*b*, 304*c* in the image. In other examples, image data values may only be blended for a subset of the pixel locations 304*a*, 304*b*, 304*c* in the image. A combination of selecting between the first 204 and second 208 processed image data and blending image data values of the first 214 and second 216 image data values may be used for different pixel locations in the image when generating the output image data 212. Blending between image data values 214 of the first processed image data 204 and image data values 216 of the second processed image data 208 at regions of the frames of image data which represent a transition between two colors may improve the perceptual quality of the transition by mitigating the potential severity in the transition between the two regions.

In some examples, blending the second image data values 214 with the third image data values 216 includes using alpha blending second image data values 214 and third image data values 216 representing the same pixel locations. Alpha blending, or alpha compositing, is generally a process for combining two images, such as an image of a background and an object, to create the appearance of partial or full transparency. Where the two images being blended are the same image but represented differently, alpha blending provides a method for generating a weighted average of the representations of the same image. In the present example, alpha blending can be used to generate a weighted average between the first processed image data 204 and the second processed image data 208. Alpha blending in this way may be performed using the same weightings across the whole of the first processed image data 204 and the second processed image data 206 or may be performed differently for individual pixel locations, or subsets of pixel locations.

Figure 7:
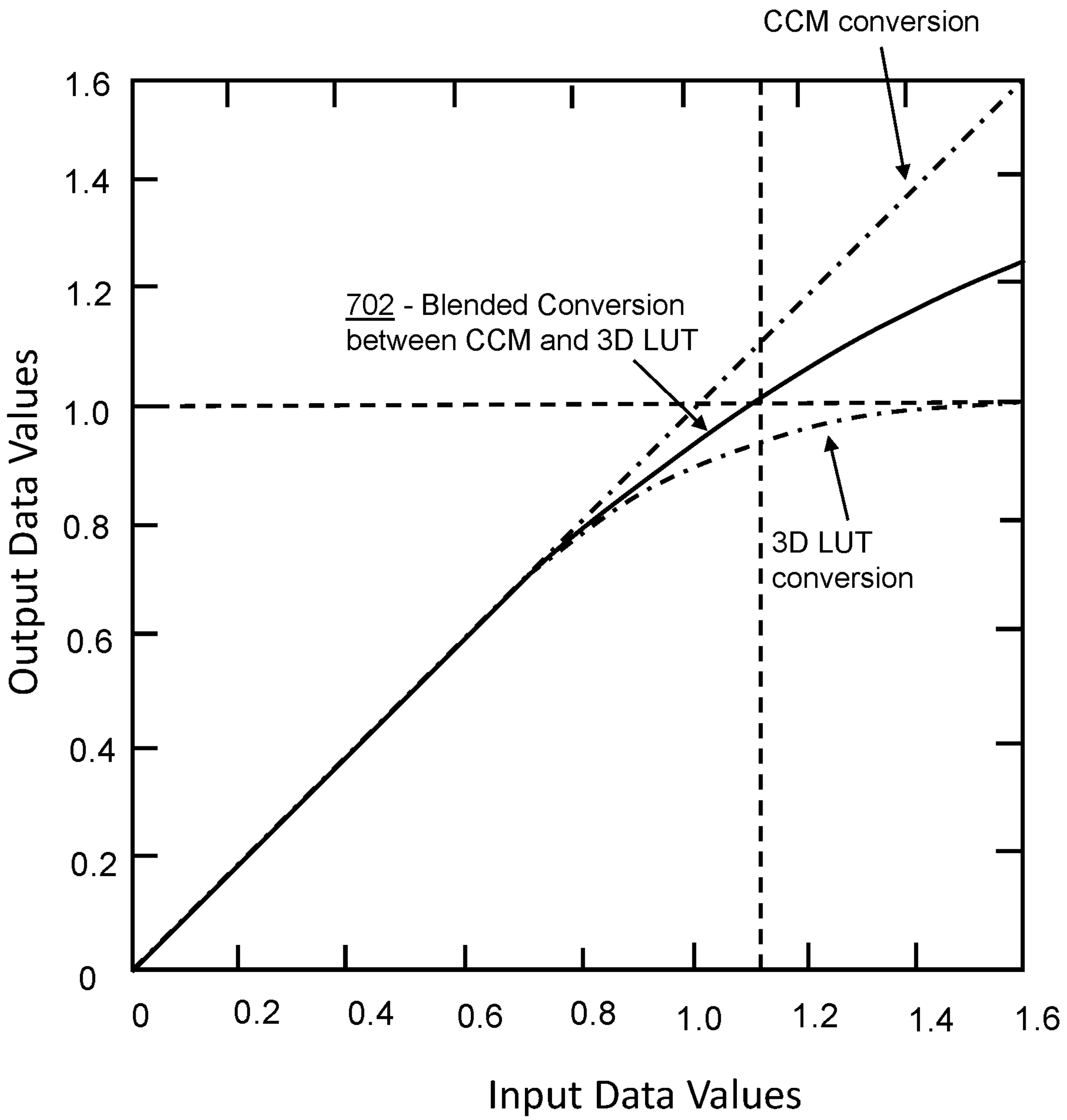
FIG. 7 is a graph illustrating an effect of blending output data values generated using a first color space conversion process with output data values generated using a second color space conversion process applied to a simplified one-dimensional data set according to examples.

FIG. 7 shows, using a simplified one-dimensional data set, how blending output data values which have been generated using two different processes, such as a CCM and 3D LUT, can in effect produce a transformation 702 which is between the transformation implemented by the CCM process and the 3D LUT process. By modifying the weight values used in the alpha blending it is possible to modify the effective transformation 702 generated such that the largest data value in the input data set is not clipped in the output data range. Additionally, some non-linearity can still be introduced towards the boundary of the output data range.

Figure 8:
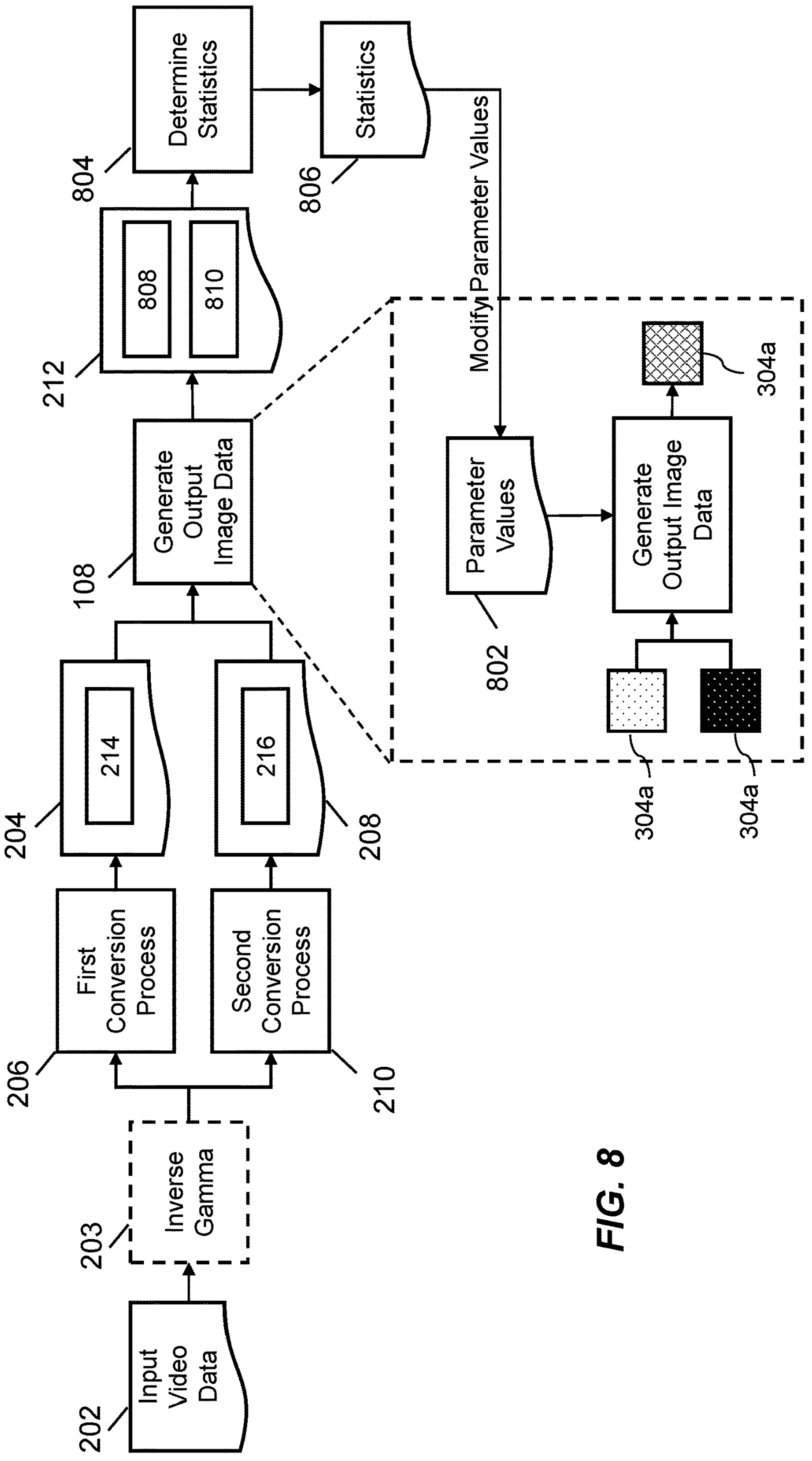
FIG. 8 is a schematic diagram showing the computer-implemented method according to examples which include using alpha blending to generate the output image data.

FIG. 8 shows an example of the method 100 in which generating 108 the output image data includes alpha blending. Where alpha blending is used, the method 100 comprises storing a set of one or more parameters values 802 and blending the image data values 214 in the first processed image data 204 with respective image data values 216 in the second processed image data 208 according to the set of one or more parameter values 802. The parameter values 802 may define one or more weights which are multiplied by image data values when performing blending. In some examples, a single parameter value may be used to perform alpha blending for all of the first processed pixel data 502 and the second processed pixel data 504. Alternatively, different parameter values 802 may be used for each color such that image data values associated with different colors are blended according to different parameter values. In further examples, each pixel location, or subsets of pixel locations, may be associated with respective parameter values for blending respective image data values for those locations.

In some examples, the one or more parameter values 802 may be updated based on the output image data 212, for example, to modify the blending based on the accuracy of colors represented in the output image data 212. The one or more parameter values may, in some cases, also be determined based on the input image data 302 and/or the first processed image data 204 and the second processed image data 208. In some examples, generating 108 the output image data 212 includes generating a sequence of frames of output image data corresponding to the sequence of frames of input image data. In particular, the generating 108 the output image data 212 includes generating a first frame of output image data 808. The first frame of output image data 808 may be processed 804 to determine output image data statistics 806 and then a second frame of output image data 810 may be generated, wherein the second frame of output image data 810 is dependent on the output image data statistics 806. For example, the set of one or more parameter values 802 may be modified based on the statistics 806. The modified set of parameters values 802 may be used when generating the second frame of output image data 810, for example, to blend image data values generated using two different color space conversion processes. In examples where image data values are selected from either of the first processed image data 204 and the second processed image data 208, the statistics 806 may be used to determine which of the image data values are to be selected for each pixel location, or for a subset of pixel locations. In some examples, not shown, determining the statistics 806 may also be based on the input image data 302 and/or the first processed image data 204 and the second processed image data 208.

In one example, the statistics 806 may include an indication of a proportion of pixel locations in the output image data 212 which are clipped. For example, where it is determined from the statistics 806 that a predetermined proportion, such as more than 5%, of pixels represented by the fourth image data values 602 in the output image data 212 are clipped, then the one or more parameter values may be modified to increase the proportion of the third image data values 214 of the second processed image data 204, generated using a 3D LUT, which contributes to the output image data 212. The extent to which the one or more parameter values 802 are modified may be proportional to ratio of pixel locations which are clipped in the output pixel data 602. For example, where only a small proportion, say less than 0.01%, of pixel locations are clipped in the output image data 212, the parameter values 802 may only be modified by a relatively small amount. Whereas, in examples where a large proportion, say more than 5% of pixel locations are clipped in the output image data 212, the parameter vales 802 may be modified by a larger amount.

In other examples, the statistics 806 may include a comparison between the maximum saturation available in the output color space and the maximum saturation reproduced using the output image data 212, and in particular a given frame of output image data 212. In this way, the statistics 806 may indicate that a full range of the output color space is not being utilized by the output image data 212. In this case, the one or more parameter values 802 may be modified to increase the relative contribution of processed image data 208 generated using the second color space conversion process 210, which in this example includes using a 3D LUT.

In instances where there is a plurality of parameter values 802, each being associated with a different subset of pixel locations, only a subset of the plurality of parameter values 802 may be modified in response to the statistics 806. For example, where the statistics specify a proportion of pixel locations which are clipped in the output image data 212, only parameter values 802 associated with clipped pixel locations may be modified in response to the statistics 806.

Modifying the one or more parameter 802 values can improve the performance of the method 100 when processing subsequent frames of input image data to generate frames of output image data 212. For example, adjacent frames of image data in the input video data 202 may be likely to be similar in content gamut, for example, where adjacent frames of image data are captured in the same scene. By modifying the parameter values, to tune the performance of the alpha blending, based on the statistics 806 generated for the first frame of output image data 808 it becomes possible to improve the performance of the method when converting from an input color space to an output color space for subsequent frames of image data which have a similar content gamut to the first frame of image data. In particular, the second frame of output image data 810 corresponding to the subsequent frame of input image data may more accurately represent the colors of the subsequent frame input image data when reproduced on a digital display than the first frame of output image data 808 represents the colors of the first frame of input image data 302.

It will be appreciated by those skilled in the art that generating 108 output image data 212 may include further steps beyond those illustrated in FIGS. 2 to 8. For example, where the method 100 includes applying an inverse gamma function 203 to the input data 202, generating 108 the output image data 212 may include applying a gamma function to the output image data 212. The output image data 212 may be included in output video data, such as an output video stream. In this respect, the output image data 212 may be processed for inclusion in output video data. In the examples shown in FIG. 8 in which statistics 806 are determined 804, the gamma function may be applied to the output image data 212 after the statistics 806 have been determined. This is because the gamma function may influence the statistics which are determined from the output image data 212 and so, in order to determine accurate statistics 806 of the output image data 212 the gamma function is applied afterwards. Other post processing techniques may also be applied to the output image data 212 for example, to modify, compress, or encode the output image data 212.

Figure 9:
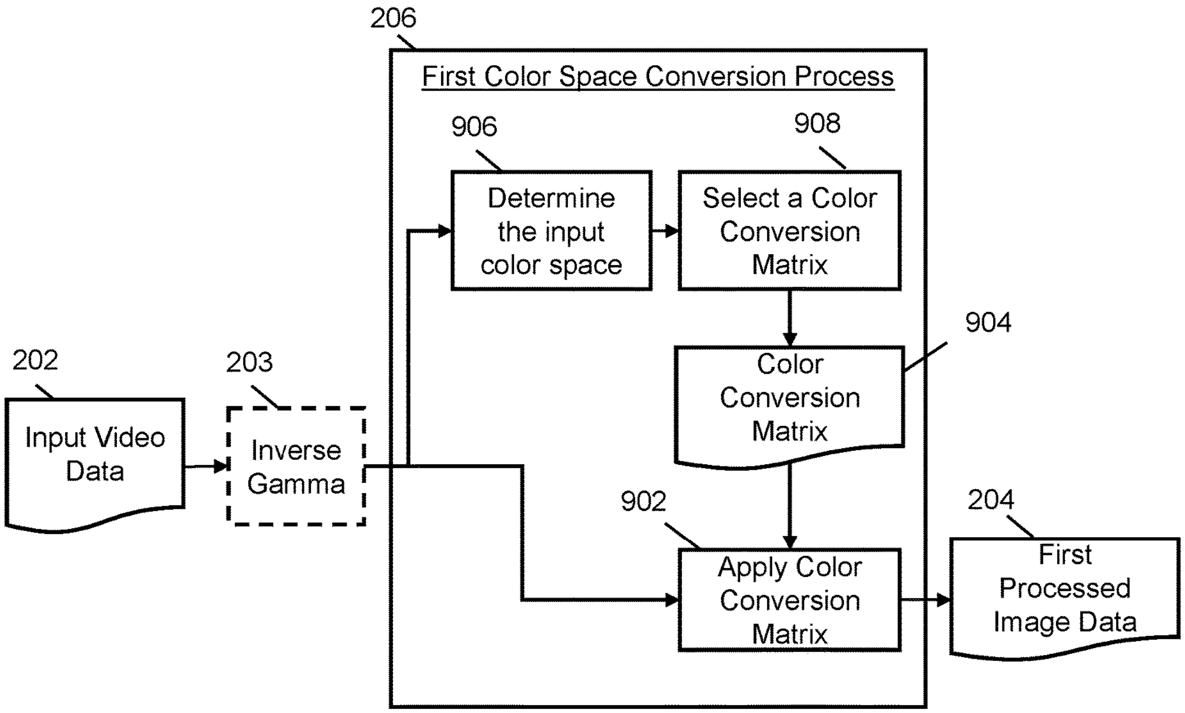
FIG. 9 is a schematic diagram illustrating an example of a first color space conversion process which includes using a color conversion matrix.

As described above, using static mapping functions for the first color space conversion process 206 and the second color space conversion process 208 provides faster, and less compute intensive methods for processing frames of input image data 302 to convert an input color space to an output color space. However, this relies on mapping functions, such as a CCM and/or a 3D LUT, between the input color space and the output color space to be available. FIG. 9 shows an example in which a color space conversion function used in the first color space conversion process 206 includes applying 902 a color conversion matrix 904 to the input video data 202 to generate first processed image data 204. In the example shown in FIG. 9, the method 100 includes determining 906 the input color space based on the input image data 302 and selecting 908 a color conversion matrix 902 to be used when processing the input image data 302. Determining the input color space, used to represent colors in the input image data 302 may be determined from metadata in the input video data 202 which is associated with, or included as part of, the input image data 302. For example, a header portion of the input video data 202 may specify a standard, such as Rec. 2020 used in the input video data 202. Alternatively, or additionally, the input color space may be determined based on the format of data included in the input video data 202. As described above, different standards specify how colors are to be represented in image data, and so by analysing the input video data 202 to determine the format of data, it may become possible to identify a color space used in the input video data 202.

The color conversion matrix 904 may be selected from a set of two or more color conversion matrices. For example, a computer system, which will be described in more detail below with respect to FIG. 12, may store a plurality of color conversion matrices. Each of the color conversion matrices representing a mapping from a different respective input color space to a target output color space. The target output color space may relate to a color space used by a digital display which is part of the computer system. In other examples, the set of two or more color conversion matrices may include color conversion matrices which each map from one of a plurality of input color spaces to one of a plurality of output color spaces. By including the steps of determining 906 the input color space, and selecting 908 a color conversion matrix 904, the method 100 may be readily applied to input video data 202 which includes a sequence of frames of image data represented according to any of a plurality of different input color spaces, provided there is a suitable color conversion matrix 904 available.

Figure 10:
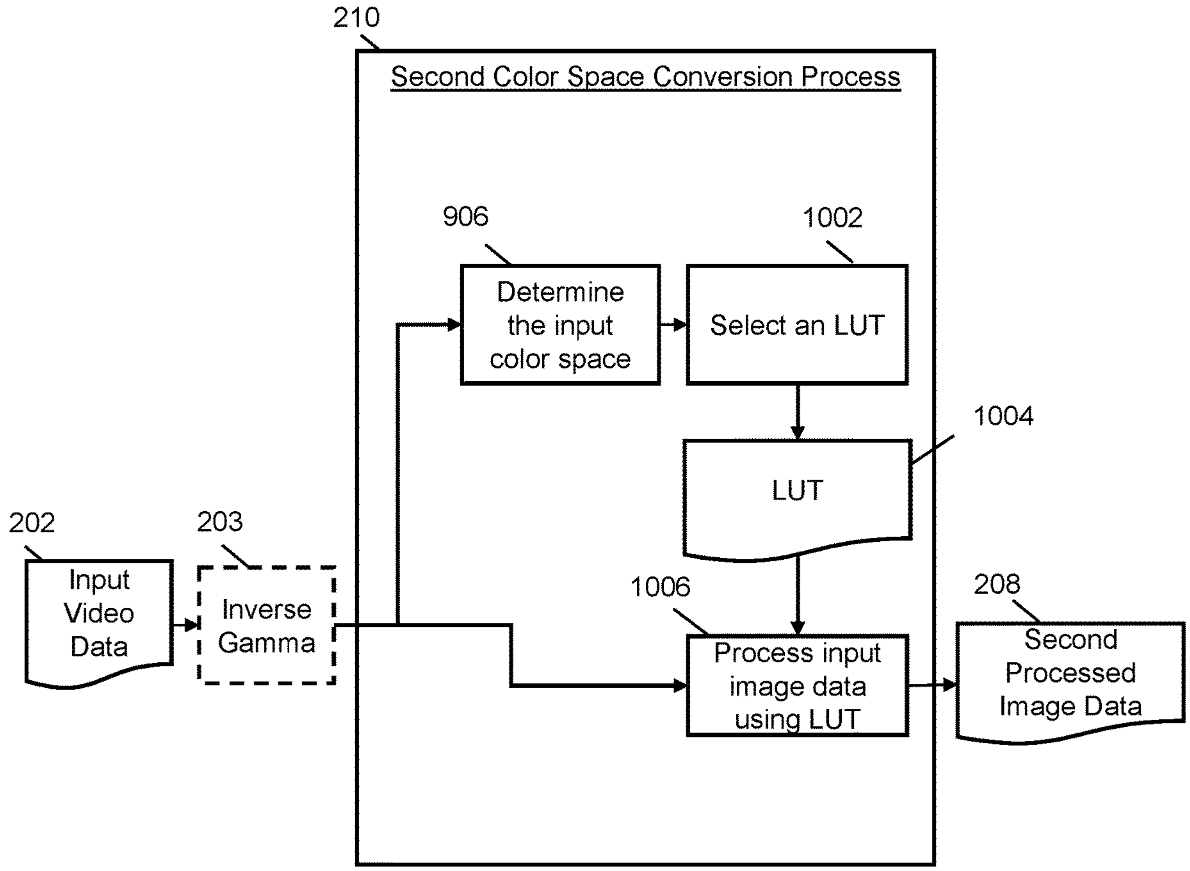
FIG. 10 is a schematic diagram illustrating an example of the second space conversion process which includes using a Lookup-Table.

FIG. 10 shows an example in which a color space conversion function used in the second color space conversion process 210 includes processing the input video data 202 with a Lookup Table, and in particular a 3D LUT, to generate the second processed image data 208. In the example shown in FIG. 10, the method 100 includes determining 906 the input color space based on the input image data 302 and selecting 1002 an LUT 1004 based on the input color space to be used to process 1006 the input video data 202. The LUT 1004 may be selected from a set of two or more LUTs. For example, the computer system, may store a plurality of LUTs each mapping from a different input color space to an output color spaces, or may store a plurality of LUTs which each map from one of a plurality of input color spaces to one of a plurality of output color spaces.

In some examples, not shown, the second color space conversion process 210 may include, before processing the image data 302 using the 3D LUT 1004, processing the image data 302 with a one-dimensional (1D) LUT. The 1D LUT may be referred to as an equidistant 1D LUT which is used to redistribute image data values in the input image data 302 to match a distribution of entries in the 3D LUT 1004. As described above, the 3D LUT may include higher densities of entries around certain colors, and as such redistributing the image data values in the input image data 302 can increase the accuracy of color space conversion using the second color space conversion process 210.

Figure 11:
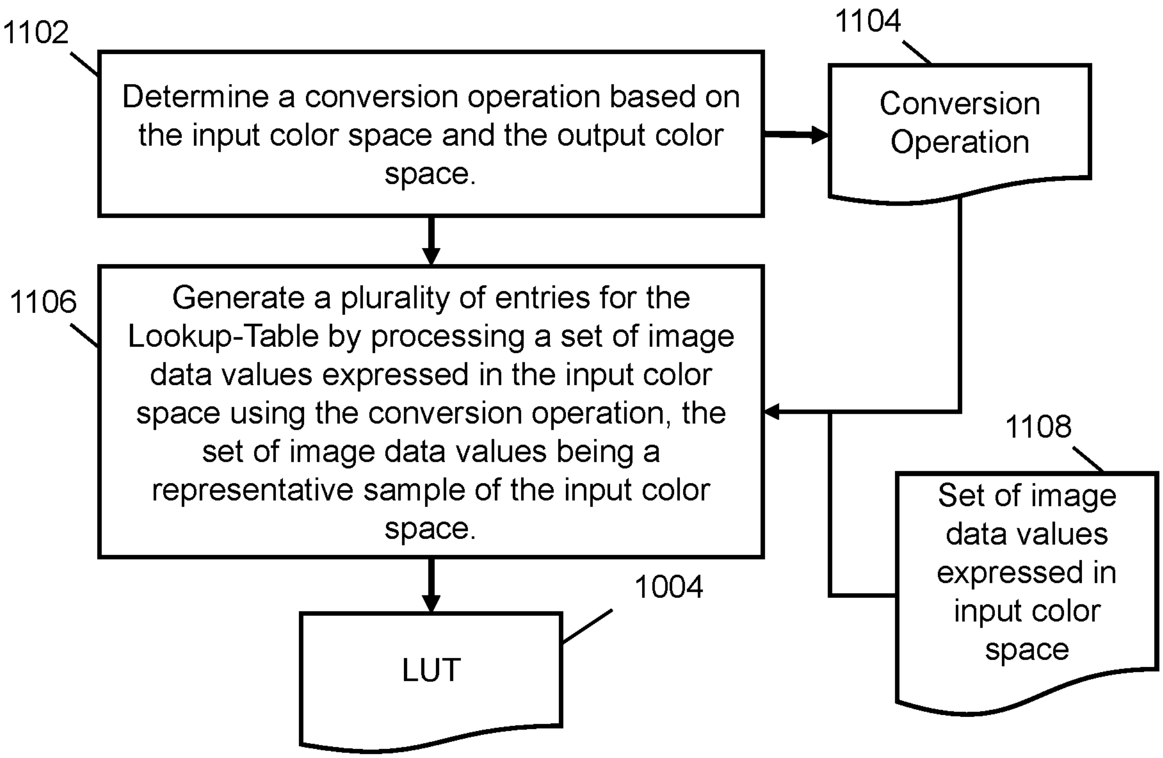
FIG. 11 is a schematic diagram showing a process of generating a Lookup-Table according to examples.

In some cases, if a suitable LUT 1004 is not available, the method 100 may include generating the LUT 1004 based on the input color space and the output color space. FIG. 11 shows an example of steps for generating the LUT 1004. In the example shown in FIG. 11, generating the LUT 1004 includes determining 1102 a conversion operation 1104, based on the input color space and the output color space, and generating 1106 a plurality of entries for the LUT 1004 by processing a set of image data values 1108 expressed in the input color space using the conversion operation 1104. The set of image data values 1108 which are processed include a representative sample of the input color space. For example, the input color space may be sampled to select a sub-set of all of the colors of the input color space. The set of image data values 1108 represent the sub-set of colors of the input color space. The size of the sample of the input color space may be dependent on the total number of colors which are able to be represented in the input color space and/or the desired number of entries in the 3D LUT. The conversion operation 1104 may be a mathematical expression for transforming image data values expressed in the input color space to image data values expressed in the output color space. The primary color values expressed in the input color space and their equivalent representation in the output color space may be parameters for the conversion operation 1104. In some cases, a conversion operation 1104 may be specified as a part of a standard and so determining 1102 the conversion operation 1104 may include looking up the operation 1104 based on the input color space and the output color space.

In some examples, not illustrated, the first color space conversion process 206 or the second color space conversion process 210 may include computing transformations between an input color space and an output color space on-the-fly rather than relying on the use of static mapping information, such as a CCM or a 3D LUT. In one such example, not illustrated, the second color space conversion process 210 includes determining the conversion operation 1104 for transforming image data values represented in the input color space to image data values represented in the output color space and applying the conversion operation 1104. The conversion function 1104 may be applied to the one or more image data values in the input video data 202 to generate the second processed image data 208 including the third image data values 216.

Figure 12:
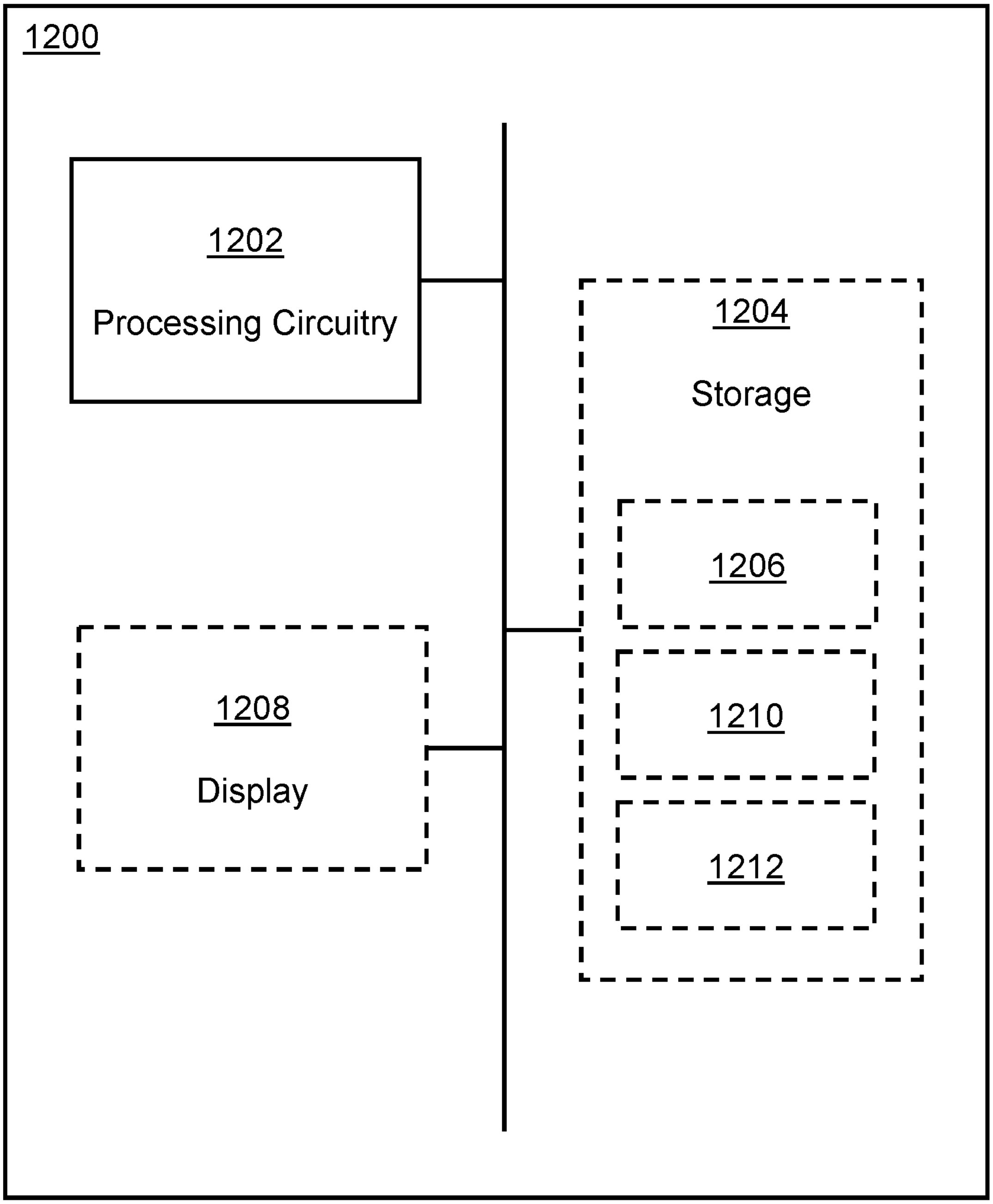
FIG. 12 is a schematic diagram of a computer system according to examples.

FIG. 12 illustrates an example computer system 1200 for implementing the method 110 according to the examples described above in relation to FIGS. 1 to 11. The computer system 1200 includes processing circuitry 1202 which is configured to perform a method 100 according to the examples described above in relation to FIGS. 1 to 11. The method 100 including at least, obtaining input video data 202, generating first processed image data 204 using a first color space conversion process 206, generating second processed image data 208 using a second color space conversion process 210, and generating output image data 212 which is derived from both the first processed image data 204 and the second processed image data 208.

The processing circuitry 1202 may include any suitable combination of processing hardware. Examples of processing circuitry which may be employed include display processing units (DPU), which include fixed function hardware which is specifically configured to perform to the method 100, central processing units (CPU), graphical processing units (GPU), image signal processors (ISP) or other suitable type of processing units. In some examples, a combination of multiple types of processing units may be included the processing circuitry 1202. Additionally, or alternatively, the processing circuitry 1202 may include other application specific processing circuitry such as an application specific integrated circuit configured to execute a method as described above with respect to FIGS. 1 to 11.

In examples where the processing circuitry 1202 comprises one or more general purpose processing units such as CPUs, GPUs, and so forth, the computer system 1200 may comprise storage 1204. The storage 1204 may store computer executable instruction 1206 which, when executed by the one or more general purpose processing units, cause the computer system 1200 to perform the method 100 described above.

The computer system 1200 shown is an example of a subsystem of a computing device. For example, the computer system 1200 may be part of a personal computer, a server, a mobile computing device, such as a smart telephone or tablet computer, and so forth. In practice, there may be many more modules connected to, or part of the computer system 1200, including for example, communication modules for sending and receiving video data 202, and image data 212. The computer system 1200 may be communicable with one or more further computer systems 1200 using the communication modules through wired or wireless means. For example, the communications modules may include wireless communication modules such as WiFi, Bluetooth, or cellular communications modules arranged to communicate with further computing devices over cellular communications protocols. Additionally, or alternatively, the communication modules may be wired communication modules. In some examples, the computer system 1200 is in communication with a camera which generates the input video data 202. In this case, the computer system 1200 may be configured to convert the input video data 202 from an input color space, associated with the camera, to an output color space in which the video is to be viewed. The computer system 1200 may then transmit the output image data 212 generated for receipt by further computing devices.

In some examples, the computer system 1200 includes a display 1208 such as an LED, OLED, LCD, Plasma, or any other suitable display which is capable of reproducing an image based on image data 212. The output color space used to represent the image in the output image data 212, may be dependent on the type of display 1208 which is included in the computer system 1200. Different display types may generally be capable of displaying different color gamuts based on the arrangement, size, type, and number of color elements included in the display. Hence, some displays may be capable of displaying a larger color gamut than other displays. To make use of the full color gamut which a display is capable of reproducing, different displays may be associated with different color spaces, that is to say that displays may including processing circuitry which is configured to process image data formatted according to one or more specific standards to represent colors. In some examples, the output color space used to represent the image in the output image data 212 may be the same color space as a color space associated with the display 1208. The gamut which is representable with a given display may not directly correspond to a color space as defined in a standard, but may be specific to the display.

While the example of FIG. 12 shows that the display 1208 is included in the computer system 1200 it will be appreciated that the display 1208 may alternatively be separate from, but communicable with, the computer system 1200. In this case, the output color space which is used to represent the image in the output image data 212 may similarly be dependent on a color space associated with the display 1208.

In some examples, in particular those described above with respect to FIGS. 9 and FIG. 10, the storage 1204 may store data to be used when executing the first color space conversion process 206 and/or the second color space conversion process 210. The storage 1204 may store a set of two or more color conversion matrices 1210 such that a color conversion matrix 904 can be selected 908 from the set of two or more color conversion matrices 1210 based on an input color space used to represent the image in the input image data 302. Additionally, or alternatively, the storage 1204 may store a set of two or more Lookup-Tables 1212 such that an appropriate Lookup-Table can be selected 1002 from the set of two or more Lookup-Tables 1212 based on an input color space used to represent the image in the input image data 302.

Figure 13:
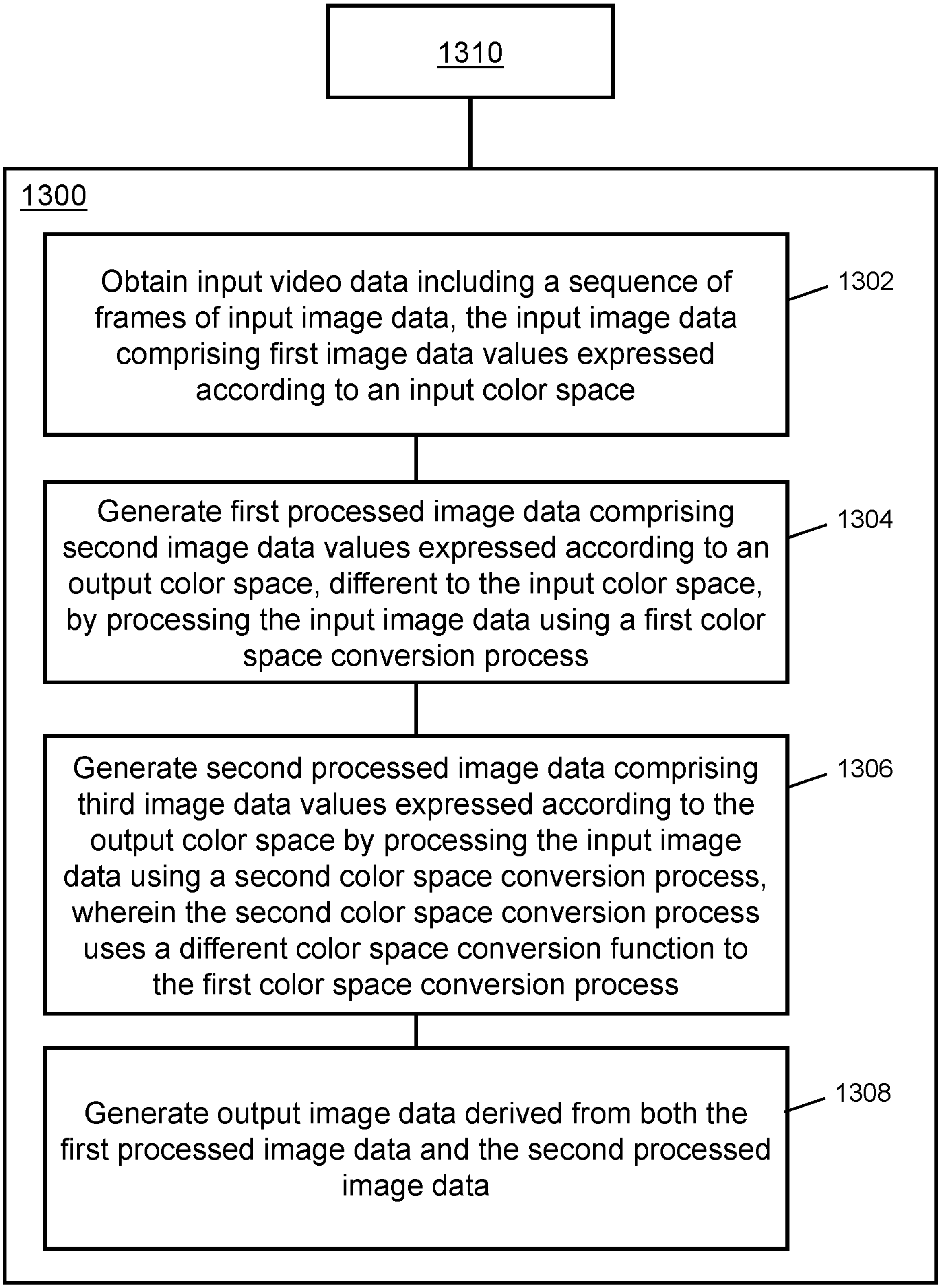
FIG. 13 is a schematic diagram of a non-transitory computer-readable storage medium according to examples.

FIG. 13 shows a non-transitory computer readable storage medium 1300 comprising computer-executable instructions 1302 to 1308 which, when executed by at least one processor 1310 cause the processor 1310 to perform a method according to the examples described above in relation to FIGS. 1 to 11.

It is to be understood that any features described in relation to any one example may be used alone, or in combination with other features described, and may also be used in combination with one or more features of any other examples, or any combination of any other examples. Furthermore, equivalents and modification not described above may also be employed without departing from the scope of the accompanying claims.

What is claimed is:

1. A computer implemented method for processing image data, the computer implemented method comprising:

obtaining input video data including a sequence of frames of input image data, the input image data comprising first image data values expressed according to an input color space and representing a plurality of pixel locations;

generating first processed image data comprising second image data values representing the plurality of pixel locations and being expressed according to an output color space, different to the input color space, by processing the input image data using a first color space conversion process;

generating second processed image data comprising third image data values representing the plurality of pixel locations and being expressed according to the same output color space as the second image data values, the third image data values being generated by processing the input image data using a second color space conversion process, wherein the second color space conversion process uses a different color space conversion function to the first color space conversion process; and generating output image data by combining the first processed image data and the second processed image data, wherein combining the first processed image data and the second processed image data comprises generating fourth image data values representing at least one pixel location by blending, from the first processed image data, second image data values representing the at least one pixel location with, from the second processed image data, third image data values representing the at least one pixel location.

2. The computer-implemented method according to claim 1, wherein generating output image data includes generating a sequence of frames of output image data corresponding to the sequence of frames of input image data, and wherein generating output image data comprises at least:

generating a first frame of output image data;

processing the first frame of output image data to determine output image data statistics; and generating a second frame of output image data, wherein generating the second frame of output image data is dependent on the output image data statistics.

3. The computer-implemented method of claim 2, wherein the output image data comprises fourth image data values representing the plurality of pixel locations expressed in the output color space, and wherein the output image data statistics include an indication of a proportion of pixel locations in the output image data which represent clipped pixel locations.

4. The computer-implemented method according to claim 1, wherein generating the output image data comprises selecting between second image data values of the first processed image data and third image data values of the second processed image data.

5. The computer-implemented method according to claim 1, wherein combining the first processed image data and the second processed image data comprises:

selecting a subset of the second image data values representing a first subset of the pixel locations; and selecting a subset of the third image data values representing a second subset of the pixel locations, wherein the first subset of pixel locations is different to the second subset of pixel locations.

6. The computer-implemented method according to claim 1, wherein blending includes alpha blending.

7. The computer-implemented method according to claim 6, wherein generating output image data includes generating a sequence of frames of output image data corresponding to the sequence of frames of image data, and wherein the method comprises:

storing a set of one or more parameter values, wherein the second image data values and the third image data values representing the pixel location are blended according to the set of one or more parameter values;

processing a first frame of output image data to determine output image data statistics;

modifying the set of one or more parameter values based on the statistics; and generating a second frame of output image data based on the modified set of one or more parameter values.

8. The computer-implemented method according to claim 7, wherein the output image data comprises fourth image data values representing the pixel locations expressed in the output color space, and wherein the output image data statistics include an indication of a proportion of pixel locations in the output image data which represent clipped pixel locations.

9. The computer-implemented method according to claim 1, wherein a color space conversion function used in the first color space conversion process includes applying a color conversion matrix to the input image data.

10. The computer-implemented method according to claim 1, wherein a color space conversion function used in the second color space conversion process includes applying a mapping to the input image data using a Lookup-Table.

11. The computer-implemented method according to claim 9, wherein the method includes:

determining the input color space based on the input image data; and selecting the color conversion matrix based on the input color space.

12. The computer-implemented method according to claim 10, wherein the method comprises:

determining the input color space based on the input image data; and selecting the Lookup-Table from a plurality of Lookup-Tables based on the input color space.

13. The computer-implemented method according to claim 10, wherein the method comprises:

determining the input color space based on the input image data; and generating the Lookup-Table based on the input color space and the output color space.

14. The computer-implemented method according to claim 13, wherein generating the Lookup-Table comprises:

determining a conversion operation based on the input color space and the output color space; and generating a plurality of entries for the Lookup-Table by processing a set of image data values expressed in the input color space using the conversion operation, the set of image data values being a representative sample of the input color space.

15. The computer-implemented method according to claim 1, wherein the second color space conversion process includes:

determining a conversion operation for transforming image data values expressed in the input color space to image data values expressed in the output color space; and applying the conversion operation to the first image data values in the input image data to generate the third image data values.

16. A computer system comprising at least one processor and storage, wherein the storage comprises computer-executable instructions which, when executed by the at least one processor, cause the computer-system to:

obtain input video data including a sequence of frames of input image data, the input image data comprising first image data values expressed according to an input color space and representing a plurality of pixel locations;

generate first processed image data comprising second image data values representing the plurality of pixel locations and being expressed according to an output color space, different to the input color space, by processing the input image data using a first color space conversion process;

generate second processed image data comprising third image data values representing the plurality of pixel locations and being expressed according to the same output color space as the second image data values, the third image data values being generated by processing the input image data using a second color space conversion process, wherein the second color space conversion process uses a different color space conversion function to the first color space conversion process; and generating output image data by combining the first processed image data and the second processed image data, wherein combining the first processed image data and the second processed image data comprises generating fourth image data values representing at least one pixel location by blending, from the first processed image data, second image data values representing the at least one pixel location with, from the second processed image data, third image data values representing the at least one pixel location.

17. The computer system according to claim 16, wherein the computer system comprises a display, and wherein the output color space is associated with the display.

18. A non-transitory computer-readable storage medium comprising computer-executable instructions which, when executed by one or more processors, cause the one or more processors to perform a process including:

obtaining input video data including a sequence of frames of input image data, the input image data comprising first image data values expressed according to an input color space and representing a plurality of pixel locations;

generating first processed image data comprising second image data values representing the plurality of pixel locations and being expressed according to an output color space, different to the input color space, by processing the input image data using a first color space conversion process;

generating second processed image data comprising third image data values representing the plurality of pixel locations and being expressed according to the same output color space as the second image data values, the third image data values being generated by processing the input image data using a second color space conversion process, wherein the second color space conversion process uses a different color space conversion function to the first color space conversion process; and generating output image data by combining the first processed image data and the second processed image data, wherein combining the first processed image data with the second processed image data comprises generating fourth image data values representing at least one pixel location by blending, from the first processed image data, second image data values representing the at least one pixel location with, from the second processed image data, third image data values representing the at least one pixel location.

* * * * *